April 9, 1968
E. W. ANDERSON
3,376,626
MEAT HANGER EXTRACTOR
Filed Nov. 18, 1964
5 Sheets-Sheet 4
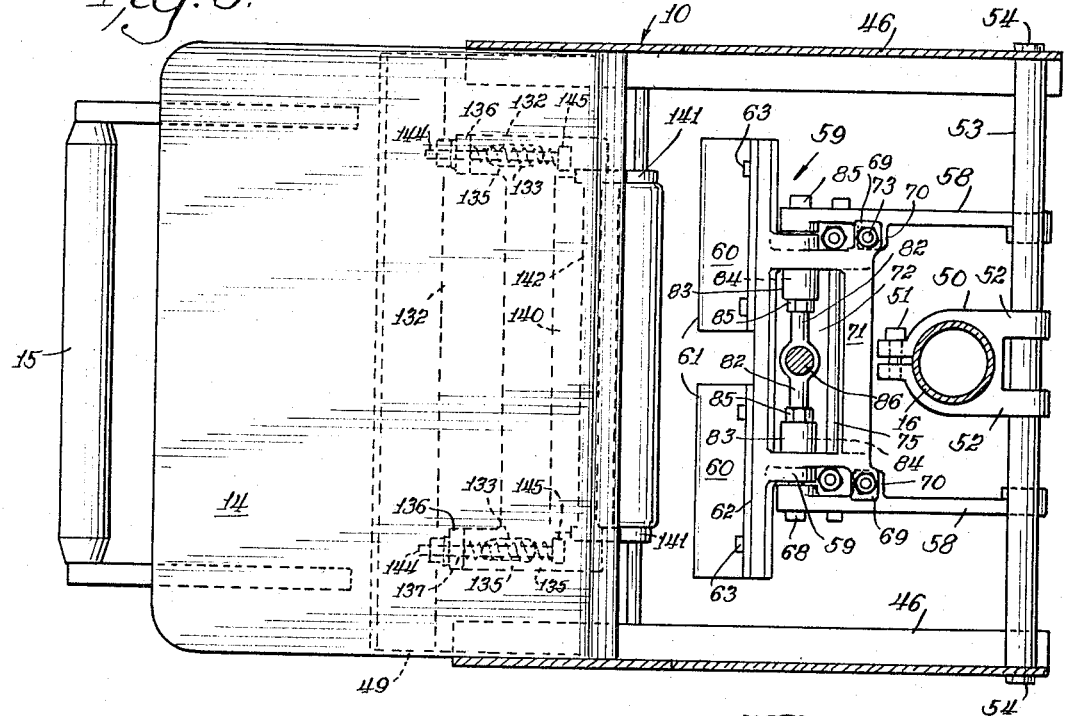
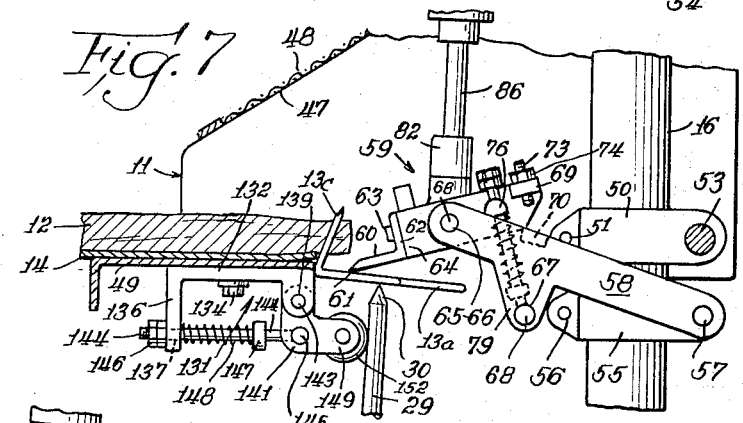
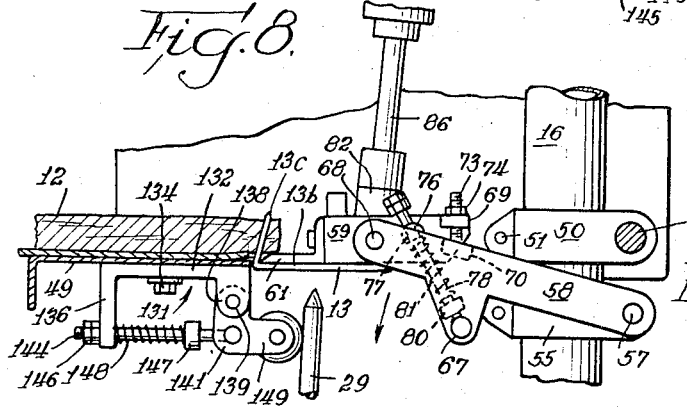
INVENTOR.
Eric W. Anderson
BY
Keith W. Wonnell
Atty.

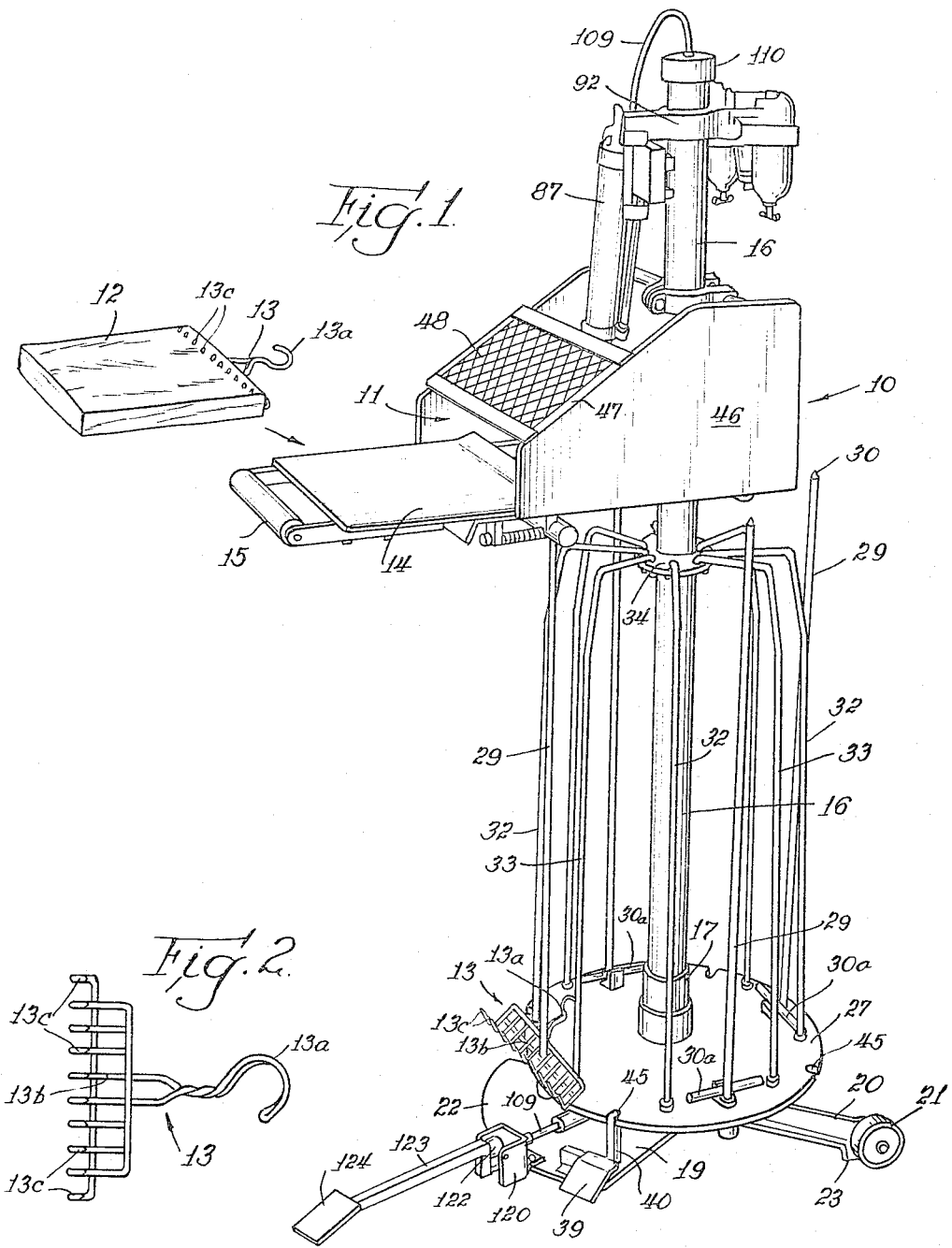

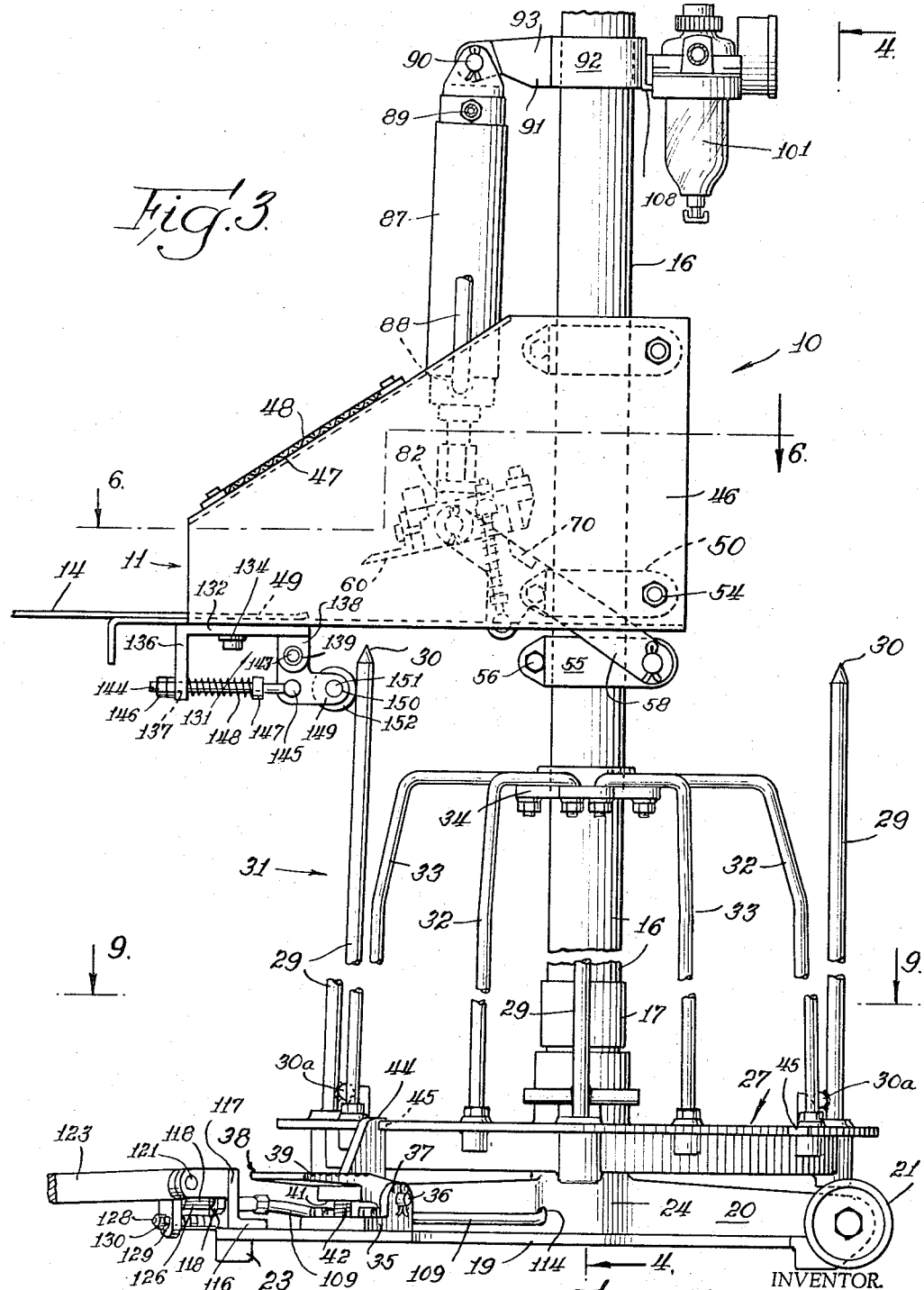

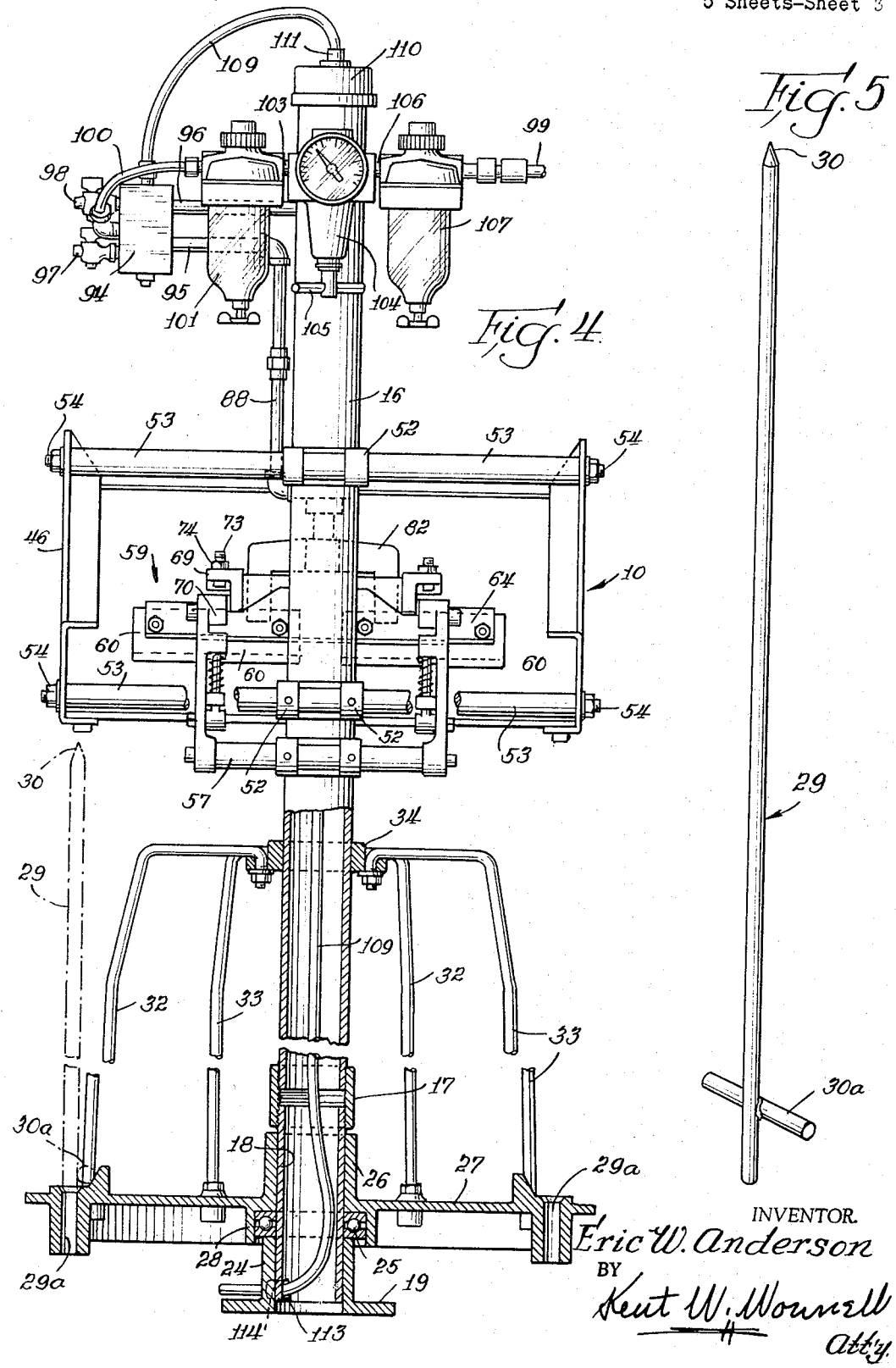

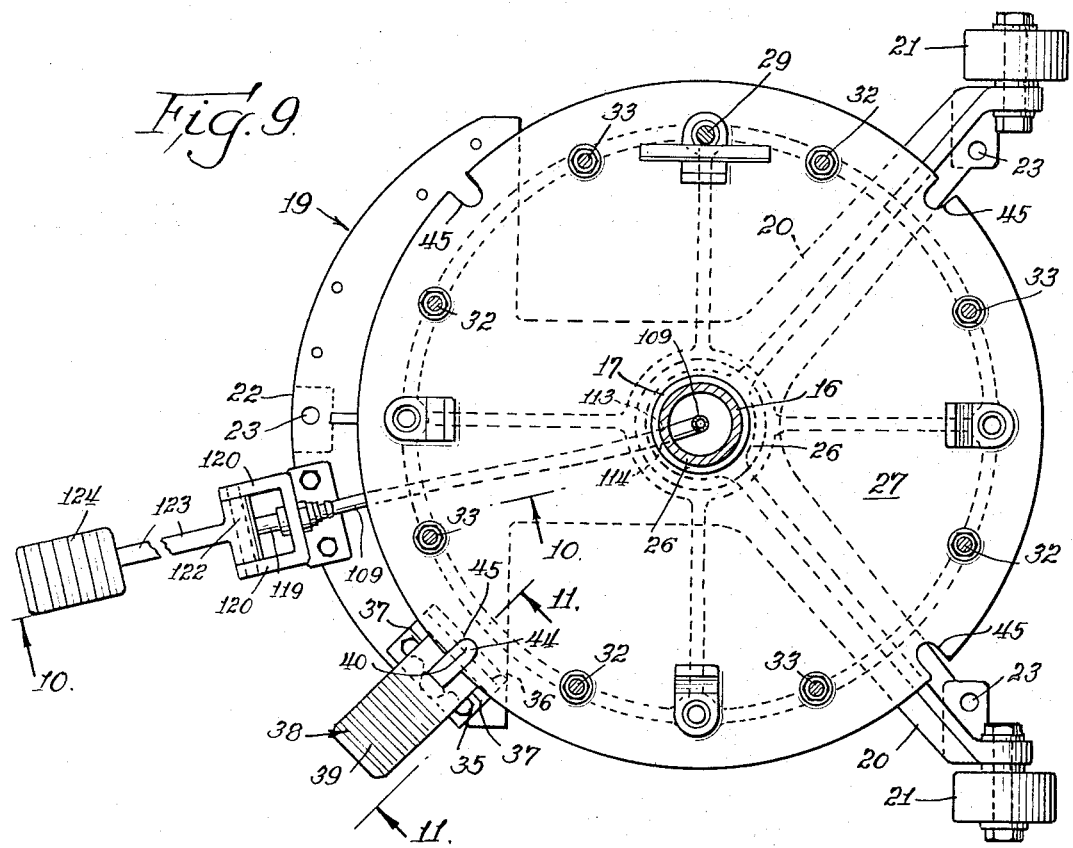

United States Patent Office 3,376,626
Patented Apr. 9, 1968

3,376,626
MEAT HANGER EXTRACTOR
Eric W. Anderson, Chicago, Ill., assignor to Dohm & Nelke, Inc., St. Louis, Mo.
Filed Nov. 18, 1964, Ser. No. 412,097
5 Claims. (Cl. 29—200)

ABSTRACT OF THE DISCLOSURE

Apparatus is provided for removing the hanger from a bacon slab. The hanger has an open wire grill and teeth which project into the slab. The apparatus comprises a hollow head with an opening at the front and a bacon slab supporting table extending from the front to the opening. A tubular vertical support extends through the head and projects above and below the head. A base is secured at the lower end of the tubular support. The bacon slab is deposited on the table with the hanger inserted in the opening. A toggle mechanism is supported by the tubular support between the support and the table and has a blade on the distal end. There is a rotatable reel mounted on the support below the head and has inserted rods with points just below the head to receive a hanger with the grill engaging said points. Means, including spring-pressed roller means, are secured to the bottom of a head to engage the pointed ends of the rods successively as the reel is rotated to flex the upper end of each rod as it approaches the hanger engaging position to engage the hanger grill as the hanger is removed. Each rod is rotated by the reel to a position back of the head where it is bodily removable from said reel with the hangers thereon. The toggle mechanism is connected to a power cylinder to operate the blade. The power cylinder is operated by a pedal lever.

---

The present invention relates to a device for removing hangers from meat slabs and collecting them for storage, and the following disclosure thereof is offered for public dissemination upon the grant of a patent therefor.

Certain slabs of bacon or other meat which are supported for chilling or curing, are taken from a refrigerator for use and sale, and the metal hangers are first removed, collected and held for reuse. The present apparatus provides mechanical means for doing this most effectively.

Important objects of my invention are: to feed the slabs and their hangers on the plate of a receiver; to pry and press hanger teeth from meat engagement; to feed removed hangers upon receiving rods; to rotatably advance rods filled with hangers; to provide foot operated air pressure means for the hanger engaging means; to apply air under observed pressure to the hanger engaging means and to bearing oilers; and to quickly remove and efficiently collect and hold the hangers ready for reuse and application to slabs of meat.

Further objects and advantages will be apparent from the following description taken in conjunction with the accompanying drawings, in which:

FIG. 1 is a perspective view of a meat hanger extractor in accordance with this invention, taken from the right front side thereof, with a meat block and hanger in front of the extractor table;

FIG. 2 is a plan view of a hanger to which the extractor applies;

FIG. 3 is a side elevation of the extractor of FIG. 1, with portions of the hanger storage rods omitted;

FIG. 4 is a rear elevation of the extractor of FIG. 1, with certain parts omitted and other shown in section;

FIG. 5 is a perspective of one of the hanger rods;

FIG. 6 is a plan view and partial section taken above the feeding table;

FIG. 7 is a detail side view showing the hanger prying means of FIG. 6 in one position;

FIG. 8 is a detail view showing the prying means of FIG. 7 in another position;

FIG. 9 is a plan view of the reel end plate with the foot pedal and the registry lever;

FIG. 10 is a side elevation of the foot pedal of FIG. 9; and

FIG. 11 is a side view of the registry lever of FIG. 9.

Referring more particularly to the drawings, the apparatus comprises a somewhat rectangular receiving head 10 with an opening 11 at the front wide enough to admit a slab 12 of meat and a hanger 13 attached to and projecting from one end of the slab.

Table support

A metal table 14 projects from the lower edge of the head at the bottom of the opening 11, which has a roller 15 at the front end to assist in advancing the slab. This table is at a height of about thirty inches or more to receive a slab of meat placed thereon at the convenient height of a worker.

Attached to the head 10 and extending through it upwardly and downwardly therefrom is a tubular support 16 connected at the bottom by an inwardly threaded nipple 17 to a short tube 18 of the same size threaded into a somewhat triangular supporting base 19. This base has two triangular legs 20 with parallel rollers 21 thereon, and a third leg with a flat bottomed supporting plate 22 all with feet having openings 23 therethrough by means of which it may be secured in place, if desired. By lifting the plate 22 the entire apparatus may be easily moved on the rollers 21.

Extending upwardly from the base 19 is a short boss 24 into which the short tube 18 is threaded. The place on this short tube 18 below the nipple 17 is filled by a ball bearing 25 which freely supports a hub 26 for turning thereon. This hub 26 is part of a circular reel end plate 27 also having a lower or under ring 28 which extends over the ball bearing 25. The outer circular edge of the reel end plate 27 does not extend outwardly to cover the two legs 20 or the supporting plate 21 of the triangular base 19, which therefore gives the head 10 considerable stability.

Hanger supporting reel

Extending upwardly from sockets 29a in the end plate 27 at equal distances in the outer edge are straight metal rods 29 with cross pieces 30a near the bottom to limit insertion in the sockets 29a, and sharp upper ends 30 which extend just below the bottom of the head. Three rods are covered by the head 10 and the fourth extends beyond the back thereof showing the usual location of the head and the reel 31 in general. Also permanently mounted in the reel end plate 27 are pairs of upwardly extending metal rods 32 and 33 spaced inwardly from the edge of the plate 27 more than the four rods 29 and equally therefrom. Each rod 29 and its two associated rods 32 and 33 are located to engage a number of hangers 13 thereon and to support them against turning, as hereafter set forth.

The upper ends of the rods 29 are free for limited movement although firmly inserted into or otherwise secured into the plate 27 at the bottom, but the rods 32 and 33 are each bent over inwardly at its upper end secured in a collar 34 surrounding the tubular support 16 for free rotation, but clamped in the collar against outward flexing movement. The outer intermediate portions of the rods 32 and 33 and the rods 29 are substantially straight and at right angles to the reel plate 27, and only each rod 29 is flexed inwardly at the top toward its other rods 32 and 33 when it is being loaded with hangers. The upper sharp ends 30 of the rods 29 extend above the inwardly bent ends of the other rods 32 and 33.

Reel plate indexing

An indexing device for the reel plate 27 is preferably located at one end of the support plate 22 of the triangular base 19 as shown in FIGS. 9 and 11, and comprises a pivoting bracket 35 secured to the top of one end of the plate 22 having an axle 36 extending at right angles to an axial line extending through the center of the reel end plate 27 with two opposite perforated ears 37 in which the axle 26 is mounted. An operating pedal 38 is mounted between the ears 37 on the axle 36, and has an outwardly extending foot plate 39 with a ridged top engagement surface, an upward projection 40 for engaging the reel plate 27, and a lower abutment 41 above the attached surface of the bracket 35. Between this abutment 41 and the adjacent surface of the bracket is a spring 42 which tends to press the outer end of the foot pedal 38 upwardly and the upward projection 40 inwardly toward the edge of the reel end plate 27. At the top of the upward projection 40 is a horizontal guard plate 43 with a thinner vertical tooth 44 below it and extending inwardly. This tooth 44 is adapted to enter any one of four equally spaced recesses 45 in the outer edge of the end plate 27 and thereby to hold the plate in any selected position.

The indexing device is therefore located at one end of the base support plate 22 to position one of the straight rods 29 at the front of the extractor device, the tooth 44 is resiliently pressed out of engagement with an indexing recess 45, so that the reel may be rotated by hand, the foot pressure being released on the foot plate 39 and the tooth 44 being then pressed against the outer edge of the end plate 27 by the spring 42, causing the tooth to engage in the next indexing recess 45 as rotation is continued, bringing another rod 29 into the front hanger engaging position.

Attachment of head

Each head 10 attached to the tubular support 16 has side walls 46 with angular front edges 47 extending rearwardly from the opening 11 and having a cross plate 48 extending part of the way to the top. This cross plate 48 may be reticular, and between the front lower side walls 46 a bottom 49 extends only part way to the tubular support 16 as a continuation of the table 14 at the front of the head 10 for receiving the meat slabs 12 with the hangers 13 attached.

A split clamp 50 extending around the tubular support 16 has a bolt 51 for tightening it thereon, with perforated ears 52 through which a cross bar 53 extends to engage the inside lower rear edges of the side walls 46 with bolts 54 extending through the walls into the ends of the bar holding the walls tightly in place.

A similar split clamp and cross bar is secured to the tubular support 16 at the top of the head 10 and firmly secures the upper ends of the side walls 46 spaced from the tubular support at the top and rear of the head leaving the top, rear end and most of the bottom open.

The toggle action

A pivoting split collar 55 is attached to the tubular support 16 by a fastening bolt 56, and pivotally engages the mid-portion of an axle 57. The ends of the axle 57 extend outwardly at the rear of and beyond the tubular support 16, and are pivoted at the ends of arms 58 which are joined at their other ends by a toggle mechanism located in the head 10 in front of the tubular support 16.

The other ends of the arms 58 are connected at opposite sides intermediate the ends of a holder 59 for blades 60 spaced apart longitudinally at the center to avoid the central hook of a hanger 13, and the blades having sharp and wedging edges 61 less in aggregate length than a hanger, adapted to be inserted between a slab of meat 12 and its hanger 13.

The blades 60 have right angled portions 62 opposite the sharp edges, to engage an abutment 64 on the holder 59 and to be secured thereto by bolts 63. Extending from the ends of the abutment 64 are the sides of the holder each having a pivot opening 65 corresponding to a pivot opening 66 at the end of the arm 58 and movable together, to jointly receive for one end of a shaft 68; an outward ledge 69 opposite and registering with an inward projection 70 on the adjacent arm 58; and an integral end cross connecting bar 71. Thus there is a rectangular opening 72 in the holder 59 between the abutment 64, the cross bar 71, and the spaced sides, disposed entirely at the front side of the tubular support 16 at all times.

Projecting through the ledges 69 are adjustable contact screws 73 adapted to engage the projections 70, held in adjusted positions by lock nuts 74, thus limiting the movement of the holder 59 toward the arms 58.

To resiliently oppose the movement apart of the arms 58 and holder 59, a shaft 75 extends rotatably through the opening 72 and opposite side of the holder 59, and each protruding end 76 has an opening 77 through each of which one end of a bar 78 extends. The other end of the bar 78 is engaged by pivot 67 for limited swinging movement on an opposite depending projection 79 of the arm 58. On each bar 78, is a collar 80 adjustable by means of a set screw, and on the bar 78 between this collar and the end of the shaft 75 is an expanded coil spring 81 which is compressed when the holder 59 and the arms 58 are moved toward each other.

The toggle action is produced by mounting the blade 60 at one end of the holder 59 and disposing the latter at an angle to the arms 58 which have a fixed connection at the other ends with means limiting the angular movement. When arms and holder are moved toward alignment, the blades 60 are advanced, and the springs 81 are compressed. This compression allows a yielding or wedging action in advancing and assists in withdrawing and returning the blades 60 and the toggle mechanism to its ordinary position.

Power operation of toggle

The pivot openings 65 in the sides of the holder 59 and pivot openings 66 at the ends of the arms 58 move together to produce the toggle action caused by the motion of a yoke 82 having arms 83 with pivot openings 84 which register with the pivot openings 65 and 66 to receive a separate pivot pin 85 through the three members at each end of the yoke 82. The yoke extends into the opening 72 in the holder 59 and each member is rotatable on a short pivot shaft 68 having a fastening nut 85 at its inner end.

Connected to the end portion of the yoke 82 is one end of a piston rod 86 having a piston in the double acting cylinder 87 with lower and upper pipe connections 88 and 89. At the upper end this cylinder has a pivot 90 and a supporting arm 91 extending from a split clamp 92 attached by a bolt 93 to the upper end of the tubular support 16, so that it has a limited swinging movement to swing slightly due to its connection with the holder 59.

Air pressure control

A 4-way valve 94 has pipes 95 and 96 extending to the lower and upper pipe connections 88 and 89 respectively of the cylinder 87, and the valve 94 has lower and upper outlets 97 and 98 corresponding therewith. An inlet pressure pipe 99 esxtends from the valve to a suitable source of pressure supply.

An air pressure line 100 extends from the valve 94 to an air oiler 101 which has a number of pipes (not shown) extending to various oiler devices mounted to direct a supply of oil to bearings and shafts which need frequent oiling, but the oil carrying pipes and devices constitute no part of the present invention.

The oiler 101 may be connected by a pipe 103 with an air pressure gage 104 having a control 105, and it in turn may be connected by a pipe 106 to a moisture collector 107. The air pressure gage is directly supported by a hanger 108 attached to the clamp 92 and the oiler 101 and moisture controller 107 are supported therefrom by their pipes 103 and 106. These various devices are supported by their pipe connections.

Pedal valve control

Connected to the 4-way valve 94 is foot lever operating control line 109 which extends in the tubular support 16 through a cap 110 at the top and a plastic protector 111.

The control line 109 has an exit opening 113 in the short tube 18 near the bottom, and another opening 114 through the adjacent boss 24, below the reel end plate 27 but above the base supporting plate 22. An angle bracket 115 has a horizontal web 116 secured to the base plate 22 and a vertical web 117 through which the line 109 extends with locknuts 118 on the end of the line at both sides of the vertical web 117 to lock the line in place with a spring return plunger 119 at the extremity which is pushed inwardly to change the 4-way valve connections to the cylinder 87.

To effect this movement of the plunger 119, the bracket 115 has sides 120 extending beyond the end of the plunger 119. Above the plunger a pivot 121 is mounted in the sides 120 and a pedal hub 122 is rotatable thereon. Extending outwardly from this hub is a long arm 123 with a ribbed contact plate 124 at the outer end for foot engagement.

Also extending from the hub 122 at about right angles to the long arm 123 is a shorter arm 125 between the sides 120 having an abutment 126 engaging the end of the valve operating plunger 119. Between the outer end of the shorter arm 125 and the adjacent vertical web 117 of the angle bracket 115 is a coil spring 127 tending to separate them. The spring is mounted on a rod 128 secured to the vertical web 117 and projecting through a hole or slot 129 in the outer edge of the short arm. At the outer end of the rod are lock nuts 130 to limit the separation of this arm from the bracket 115, to limit the movement of the long arm 123, and to vertically position the foot contact plate 124.

Operation

Foot pressure on the pedal arm 123 causes the engagement of the plunger 119 which actuates the 4-way valve 94 to close an air pressure connection to one end or the other of the power cylinder 87. Downward movement of the piston in the cylinder actuates the toggle joint holder 59 which presses the hanger 13 attached to a slab of meat 12 in a downward direction, separating the meat from the hanger and pressing the latter downwardly upon one of the rods 29.

To feed the hangers 13, each one preferably has a central hook 13a at one side of a rectangular open grill 13b with upwardly and slightly reversely bent end teeth 13c adapted to be inserted in a slab of bacon or other meat 12 for suspending the meat by the hook for storage or refrigeration.

Feeding the meat hangers

The bottom 49 of the head 10 is in the form of a plate extending from the front meat table 14 and it extends between the side walls 46 for a short distance from the opening 11. Secured to the under side of this bottom 49 and flush with the inner edge, is a roller support 131, as shown more clearly in FIGS. 3, 6, 7 and 8, and comprising a fixed yoke bar 132 with roller mounting means at each end. Near the ends are slots 133 through which fastening bolts 134 are inserted into the bottom of the head 10 to adjust the position of the inner edge with respect to the inner edge of the bottom 49.

Each end of bar 132 has a rectangularly extending end 135, with a lug 136 at its outer end having a hole 137 near the bottom. At the inner portion of the rectangular end 135 is a shorter projection 138 than the lug 138 having a shaft hole 139 through it at right angles to the hole 137. In the shaft holes 139 of the two ends, a spring pressed cradle 140 is mounted having triangular ends 141 and a strong cross bar 142 connecting them and having short pivots 143 extending through the shaft holes 139 and into the ends of the cradle at the ends of the cross bar 142.

Extending toward the lugs 136 from the cross bar 142 in each of the ends 141 is a bolt 144 having a pivoting head 145 attached to the triangular end 141 which extends loosely through the hole 137 in the lug 136 and has lock nuts 146 at the end; a collar 147 is adjustably attached to the bolt 144 near the pivoting head 145; and on the bolt between the collar 147 and the lug 136 is a partially compressed coil spring 148. The coil springs tend to hold inwardly projecting portions 149 of the triangular ends 141 inwardly, and to return them when these springs have been compressed.

The inwardly projecting portions 149 of the triangular ends 141 are each provided with a shaft hole 150 through which bearing spindles 151 extend. A larger shaft 152 is mounted between the projecting portions 149 of the arms upon the inner ends of the spindles 151 and the outer ends of the spindles extend beyond the arms 141 and below the sides of the side walls 46.

Separation and collection of hangers

A hanger 13 is attached to one end of a slab of meat with the suspension hook 13a extending, the meat lying over the open grill 13b and the teeth 13c extending upwardly.

The blades 60 are pressed downwardly by the toggle action of the holder 59 when the wedging edges 61 engage between the grill 13b and the meat 12, they disengage the teeth 13c and by the pressure of the cylinder 87 force the released end of each hanger grill 13b downwardly against the roller shaft 152 and the open grill 13b over the sharp end 30 of the straight rod 29 positioned in contact with the large roller shaft 152.

In order to position a rod 29 against the shaft 152, the reel 31 is rotated manually until the indexing tooth 44 engages with one of the recesses 45. This brings one of the straight rods 29 directly into receiving position centrally of the edge of the bottom 49. To assume this position the rod 29 must engage the spring pressed roller shaft 152, which may yield slightly, but the upper sharp end of the straight rod 29 will be flexed inwardly or in the direction of the center of the reel, as shown in FIG. 1. The upper sharp end 30 of the rod extends above the shaft 152 and engages in an opening in the grill 13b of the hanger 13, the blades 60 forcing each separated hanger downwardly past the roller 152 and in engagement with the rod 30.

Further downward movement of each hanger 13 causes it to engage the adjacent reel rods 32 and 33 with the hook 13a in the central part of the reel 31, the grill parts 13b nested or extending close together so that a large number of hangers may be collected and stored on one rod 30.

The reel 31 is easily disengaged from its registering position by pressing upon the index foot pedal 39 which withdraws the tooth 44 from its engagement with one recess 45, and allows the reel to be turned by hand, releasing the pedal, until the next recess is engaged. During this time one rod 29 will be rotated free from engagement with the roller shaft 152, assuming a straight position, and the next rod engages the shaft and is slightly deflected thereby. The opposite rod 29 in the reel upon which many hangers 13 are collected, will then be at the back of the device, behind the head 10, and they may be taken from the top of the rod 29, or the entire rod with the hangers thereon may be pulled or bodily removed from the socket 29a of the reel 31 for access to the hangers. In removing a rod 29 and hangers 13 thereon, the hangers will be supported by the cross-piece 30a at the bottom of each rod, and all hangers on that rod are removed together.

I claim:

1. Apparatus for separating a slab of material from an end hanger having a hook projecting beyond the end of the hanger, an open wire grill and teeth insertable into the slab; said apparatus comprising a hollow head with an opening at the front and a slab table extending from the front into the opening, a tubular vertical support extending through the head and projecting below and above the head; a blade for insertion between a slab and a hanger inserted in the opening on said table, a toggle mechanism supported by the tubular support in the head between the support and the table for carrying said blade; a rotatable reel mounted on the support below the head and having inserted rods with points just below the head to receive hangers with the grills engaging said points, and means including spring pressed roller means secured to the bottom of the head to engage said pointed ends of the rods successively as the reel is rotated to flex the upper end of each rod as it approaches the hanger engaging position to place the rod point to engage in a hanger grill as the hanger is removed, and each rod being rotated by said reel to a position back of the head where it is bodily removable from said reel with hangers thereon.

2. Apparatus according to claim 1, in which a base is secured at the lower end of the tubular support, the said reel having an end plate spaced above said base, and indexing means mounted between the reel end plate and the base to position one rod at the front to receive hangers and one at the back beyond and free from the head where the rod and hangers thereon may be removed from the reel.

3. Apparatus according to claim 1, comprising a power cylinder supported at the upper projecting end of said tubular support and a piston rod extending from the cylinder and engaging the toggle mechanism to operate the blade, and fluid pressure lever operated means connected with said cylinder for actuating said toggle mechanism to remove a hanger.

4. Apparatus according to claim 3 in which said pressure means comprises a controlling pressure pipe extending from said cylinder through the top of the tubular support to the bottom thereof, with an opening through the support between the reel end and said base for the pipe, and a pedal lever supported by the base below the reel end plate having an abutment to engage a plunger at the end of said pipe for varying pressure therein by actuating the pedal to operate the piston in said cylinder.

5. Apparatus in accordance with claim 2 in which the said pointed rods are mounted in opposite sockets at the edge of the reel end plate for bodily movement therefrom, the reel end projecting rearwardly beyond the head and a rod being free for removal when in this position, and each of said pointed rods having a pair of rods fixed to the reel end at opposite sides of the pointed rods and at a less distance from axis of the reel end, and a collar to which the upper ends of said pairs are connected rotatable with the reel end, intermediate and lower portions of the last named rods being substantially parallel to the pointed rods and upper intermediate portions being inwardly inclined toward the collar to provide for engagement by the pointed rods the said grill with side portions thereof in engagement with the pair of rods to rest the said hangers on a pointed rod.

References Cited

UNITED STATES PATENTS

| | | | |
|---|---|---|---|
| 2,070,568 | 2/1937 | Almgren | 214—7 |
| 2,359,575 | 10/1944 | Norman et al. | 29—211 |
| 2,604,692 | 7/1952 | Broden | 29—208 |
| 3,193,915 | 7/1965 | Gillie et al. | 29—200 |

THOMAS H. EAGER, *Primary Examiner.*